Patented Oct. 27, 1925.

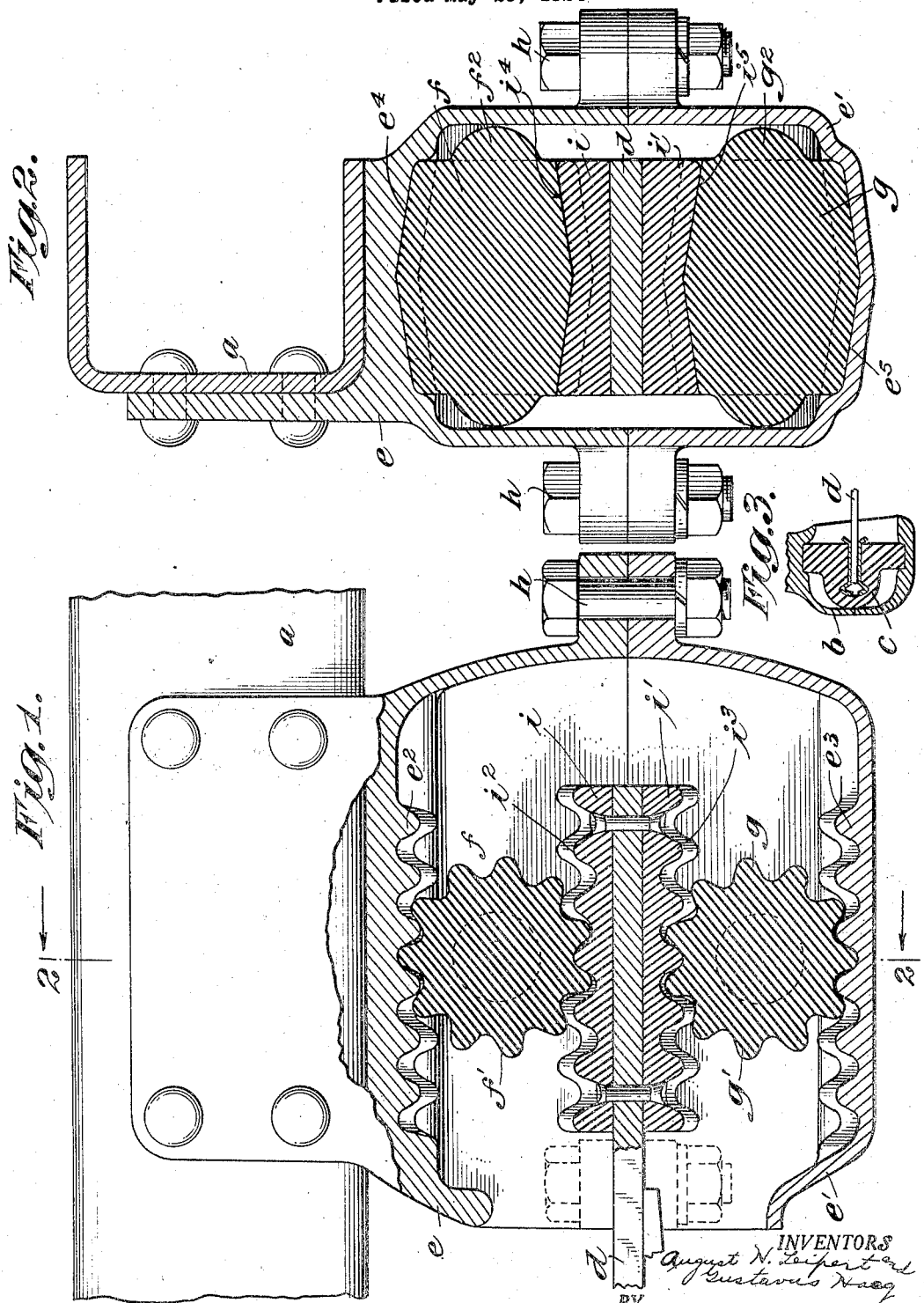

1,558,681

UNITED STATES PATENT OFFICE.

AUGUST H. LEIPERT AND GUSTAVUS HAAG, OF NEW YORK, N. Y., ASSIGNORS TO INTERNATIONAL MOTOR COMPANY, OF NEW YORK, N. Y., A CORPORATION OF DELAWARE.

CUSHION CONNECTION FOR VEHICLE CONSTRUCTION.

Application filed May 23, 1924. Serial No. 715,387.

*To all whom it may concern:*

Be it known that we, AUGUST H. LEIPERT and GUSTAVUS HAAG, citizens of the United States, respectively, residing in the borough of Queens and in the borough of Manhattan, respectively, of the city of New York, in the State of New York, have invented ecrtain new and useful Improvements in Cushion Connections for Vehicle Construction, of which the following is a specification, reference being had to the accompanying drawing, forming a part hereof.

In Letters Patent of the United States No. 1,463,655 dated July 31, 1923, there is illustrated and claimed a wholly non-metallic connection and support between the end of a vehicle spring and the frame with provision for holding one end of the spring relatively fixed while permitting relatively free movement of the other end. The present invention relates to a construction of the same general nature but in which the means for affording relatively free movement of one end of the spring differ somewhat from the means illustrated in said patent although still being of a wholly non-metallic nature. It is the principal object of the present invention to make provision for a non-metallic connection between the relatively free end of a vehicle spring and the frame which shall place no limitation on the extent of movement of the spring, the improved means being interposed only between the opposite sides of the spring and the metallic seats therefor. More particularly, the invention is concerned with a condition in which the normal load of the vehicle body is carried on a comparatively flat leaf spring whose deflections at times are of considerable extent. Still another object of the invention is to provide devices of the nature indicated which shall effectively but yieldingly resist side-sway of the vehicle at the points of support with which the invention is concerned. Other objects have to do with the durability and effectiveness of the improved connection, the ease of assembling and disassembling, its simplicity and compactness, and the maintenance of the yielding material under an internal static pressure to increase its life and resiliency.

These and other objects of the invention will appear more particularly hereinafter with reference to the accompanying drawings, wherein:

Figure 1 is a fragmentary detailed view showing the free end of a leaf spring and the improved connection between it and the vehicle frame.

Figure 2 is a view in transverse section through the parts illustrated in Figure 1.

Figure 3 is a diagrammatic view on a reduced scale illustrating a suitable connection at the front end of the spring showing means for maintaining it relatively fixed.

It is unnecessary to elaborate on the assembly illustrated since in its essential characteristics it may follow that shown in greater detail in Patent No. 1,463,655. The side frame $a$ of the vehicle may carry thereon a housing $b$ having a rubber block $c$ confined therein under compression this block, in turn, embracing the front end of a vehicle spring $d$ of leaf form, the rear end of which extends into a sectional housing $e$ which is also carried by the frame $a$. Interposed operatively between the upper side of the spring $d$ and the housing $e$ and between the lower side of ths spring and the cap $e'$ of the housing are two non-metallic rollers $f$, $g$, of yielding material such as rubber. The preferred cross-sectional form of these rollers is best illustrated in Figure 2 in which it appears that they are of reversely truncated conical form. In practice, these elements $f$, $g$, are preferably assembled under compression, the clearances being such that when the bolts $h$ are properly tightened to secure the cap E on the housing $e$ an internal static pressure is imposed on the rollers. This has been found to increase their life and resiliency. It might seem that an assembly as thus far described would meet the conditions and it may be that some modifications of the present inventive thought would do so but it is believed that the best practice will be found to require some mechanical means to move the rollers $f$, $g$, positively in step during movements of the spring. If such mechanical means are absent it is thought that the rollers $f$, $g$, will frequently get out of step and one or the other might be so displaced that it will become jammed or at least two rollers might not co-operate in the most effective manner to support the spring end. A simple form of such mechanical means is found in the moulding of what may best be likened to gear teeth $f'$, $g'$, on their peripheries and the provision of similar teeth or serrations on either the seats for the rollers in the housing or the seats for the rollers on the spring or both, in the illustrated embodiment teeth $e^2$, $e^3$ are formed in the housing and in the cap E to engage the teeth on the respective rollers $f$, $g$, and the spring end has secured thereto serrated plates $i$, $i'$, on the top and bottom side thereof, the teeth $i^2$, $i^3$, of which engage, respectively, with the teeth $f'$, $g'$, of the two rollers. When the parts are thus assembled it is evident that any movement of the spring is communicated simultaneously and to an equal extent to both of the rollers $f$, $g$, and they are held mechanically against displacement with respect to either the spring or their seats within the housing. Thus, the rollers are required to keep step with one another and conform to the spring movements sensitively but displacement thereof is avoided. These rollers do not impose any limitation on the amplitude of movement of the free end of the spring within the housing.

To resist side-sway of the vehicle at the point of connection under consideration very simple means are illustrated resting primarily upon the reversely truncated form of the rollers. Reversely inclined seats $e^4$, $e^5$ are formed in the housing and in the cap conforming to the shape and dimensions of the respective rollers $f$, $g$, and similar seats $i^4$, $i^5$, are formed in the plates $i$, $i'$, respectively, engaging with the rollers $f$, $g$. When the parts are assembled under compression the material of the rollers $f$, $g$, will be distorted to a degree depending on the amount of compression and some of this distortion at the opposite ends of the rollers $f$, $g$, will create cushioning bosses $f^2$, $g^2$, adapted to engage the side walls of the housing and further resist side-sway. If such bosses are not of sufficient bulk by virtue of distortion they may be deliberately moulded on the ends of the rollers as will be evident. The reversely opposed seats for the rollers will set up resisting forces against side-sway and serve the intended purposes.

One or more of the several features of the invention described in detail herein may be omitted without departing from the spirit thereof since while it is believed that the best results will be obtained by means which are substantially of the form illustrated and described the same results to a degree will doubtless result from the use of equivalents and where some of these features are entirely omitted.

What we claim is:

1. In combination with the spring and frame of a motor vehicle, a mechanical connection and support interposed between one end of the spring and the frame, and a wholly non-metallic support interposed between the other end of the spring and the frame, and including a plurality of non-metallic yielding elements engaging opposite sides of the spring and adapted to roll on their own axes, respectively, upon longitudinal movement of the spring.

2. In combination with the spring and frame of a motor vehicle, a mechanical connection and support interposed between one end of the spring and the frame, and a wholly non-metallic support interposed between the other end of the spring and the frame, including a plurality of non-metallic yielding elements engaging opposite sides of the spring and adapted to roll on their own axes, respectively, upon longitudinal movement of the spring, and means to cause said elements to move synchronously with movements of the spring.

3. In combination with the spring and frame of a motor vehicle, a mechanical connection and support interposed between one end of the spring and the frame, and a wholly non-metallic support interposed between the other end of the spring and the frame, including a plurality of non-metallic yielding elements engaging opposite sides of the spring and adapted to roll on their own axes, respectively, upon longitudinal movement of the spring, and interengaging portions formed on the respective elements and their seats to cause synchronous movements thereof with the movements of the spring.

4. In combination with the spring and frame of a motor vehicle, a mechanical connection and support interposed between one end of the spring and the frame, and a wholly non-metallic support interposed between the other end of the spring and the frame, and including opposed curved non-metallic elements disposed above and below the spring and moulded with projected portions on their surfaces for engaging with corresponding seats carried with the spring whereby movements of the elements are synchronous with the movements of the spring.

5. In combination with the spring and frame of a motor vehicle, a mechanical connection and support interposed between one end of the spring and frame, and a wholly non-metallic support interposed between the other end of the spring and the frame, and including generally cylindrical roller elements of non-metallic yielding material of truncated conical form.

6. In combination with the spring and frame of a motor vehicle, a mechanical connection and support interposed between one end of the spring and frame, and a wholly non-metallic support interposed between the other end of the spring and the frame, including generally cylindrical roller elements of non-metallic yielding material of truncated conical form, and correspondingly inclined seats for the rollers whereby sidesway is resisted.

7. In combination with the spring and frame of a motor vehicle, a mechanical connection and support interposed between one end of the spring and frame, and a wholly non-metallic support interposed between the other end of the spring and the frame, including generally cylindrical roller elements of non-metallic yielding material of truncated conical form, and correspondingly inclined seats for the rollers whereby sidesway is resisted, teeth moulded on the surfaces of the rollers and corresponding teeth moulded on the said seats for co-operation with the first-named teeth.

This specification signed this 19 day of May A. D. 1924.

AUGUST H. LEIPERT.
GUSTAVUS HAAG.